Aug. 8, 1950 P. F. HENRY 2,517,875
POWER TRANSMISSION
Filed Oct. 25, 1947 2 Sheets-Sheet 1

INVENTOR.
Phillips F. Henry
BY
ATTORNEY

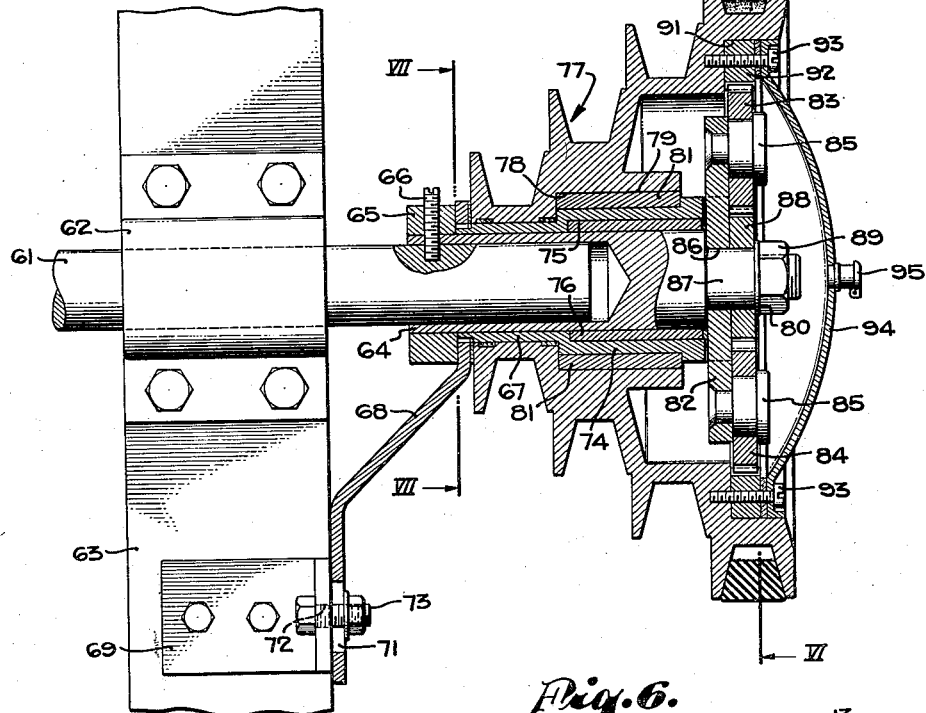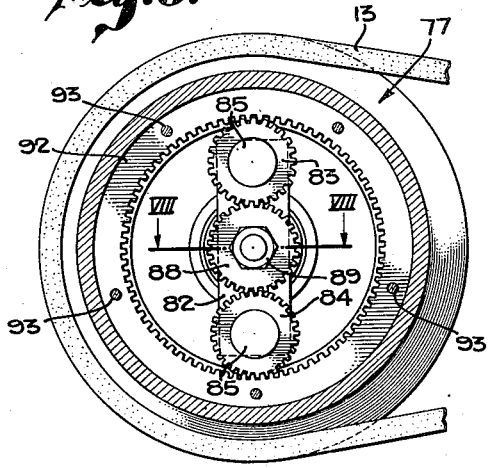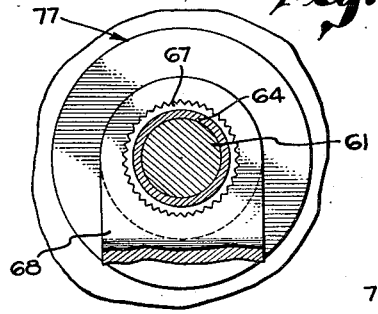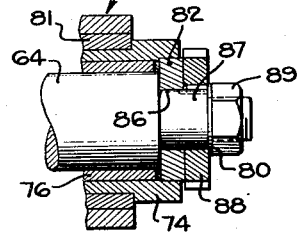

Patented Aug. 8, 1950

2,517,875

UNITED STATES PATENT OFFICE 2,517,875

POWER TRANSMISSION

Phillips F. Henry, Springfield, Oreg.

Application October 25, 1947, Serial No. 782,191

4 Claims. (Cl. 74—785)

This invention relates to improvements in pulleys and particularly relates to variable speed pulleys arranged to permit selective variation of the speed of the pulley with relation to the shaft upon which it is carried.

Stepped pulleys have been used for a long period of time as a means of transmitting power from one shaft to another, such pulleys permitting variation in speed to be obtained from a driving shaft, rotated at a constant speed to a driven shaft spindle or quill. One method of utilizing stepped pulleys is illustrated in the multiple drilling machine shown in Patent No. 2,381,039. Only a limited variation in spindle speeds is obtainable by the use of normal stepped pulleys. Such available variation in speed is inadequate for the great range of speeds which is needed in precision work and in order to more effectively perform operations on materials of different characteristics. Density and hardness of the materials upon which work is being performed, the character of the operation being conducted, the quality of the finish which it is desired to attain and many other factors must be taken into consideration in establishing the most effective speed for the tool or the work.

The present invention relates to a pulley of the stepped type provided with an internal, completely housed, differential gearing, whereby the range of speeds available with a given stepped pulley is greatly increased. Pulleys of the present invention may be used with lathes, drill presses, milling machines, shapers, band saws, routers and various other kinds of equipment of both metal working and wood working types. A pulley of the present invention may be readily substituted for prior pulleys; for example, a pulley of the present invention, when used instead of pulley 12 of the Patent No. 2,381,039, makes available an increased range of spindle speeds without other structural changes in the machine.

Furthermore, the preferred form of pulley embraced by this invention makes such increased range of speeds available without interfering with or changing the usual or normal direction of rotation.

It is a primary object of this invention to provide a pulley having a transmission that may be selectively adjusted to vary the speed of the pulley relative to the shaft on which it is mounted.

Another object is to provide a transmission for step pulleys for selectively varying the speed of the pulley relative to the shaft on which it is mounted, whereby to greatly increase the flexibility of the speed variation of a pulley.

A further object is to provide a pulley having a transmission for increasing or decreasing the speed of a pulley relative to the shaft on which it is mounted, without changing the direction of the rotation of the pulley relative to the shaft.

A still further object is to provide a pulley having a transmission for selectively rotating directly with the shaft on which it is mounted or rotating it at a relatively slower speed than the shaft on which it is mounted.

Still another object of the invention is to provide a pulley having a transmission, when mounted on a driving shaft, which will operate to selectively rotate at the same speed of the driving shaft or at a slower speed relative to the driving shaft.

An additional object is to provide a pulley having a transmission, when mounted on a driven shaft, which will operate to selectively rotate at the same speed of the driven shaft or a greater speed of the driven shaft.

Still other objects reside in the provision of a pulley having the above characteristics that will be durable, comparatively simple in structure, that will be practically frictionless and operate over long periods of time without heating, that will be easily and readily adjusted to produce the desired speeds, that may be used either on a driving or a driven shaft and which will be comparatively cheap to manufacture.

The above and other objects will be made apparent throughout the further description of the invention when taken in connection with the accompanying drawings, wherein like reference characters refer to like parts. It is to be distinctly understood that the drawings are not a definition of the invention but merely illustrative certain exemplary forms by means of which the invention may be effectuated.

Referring to the drawings:

Fig. 5 is a vertical sectional view of a device illustrating another embodiment of the invention.

Fig. 6 is a sectional view taken along the line VI—VI of Fig. 5.

Fig. 7 is a sectional view taken along the line VII—VII of Fig. 5.

Fig. 8 is a detailed sectional view taken along the line VIII—VIII of Fig. 6.

Figure 1:
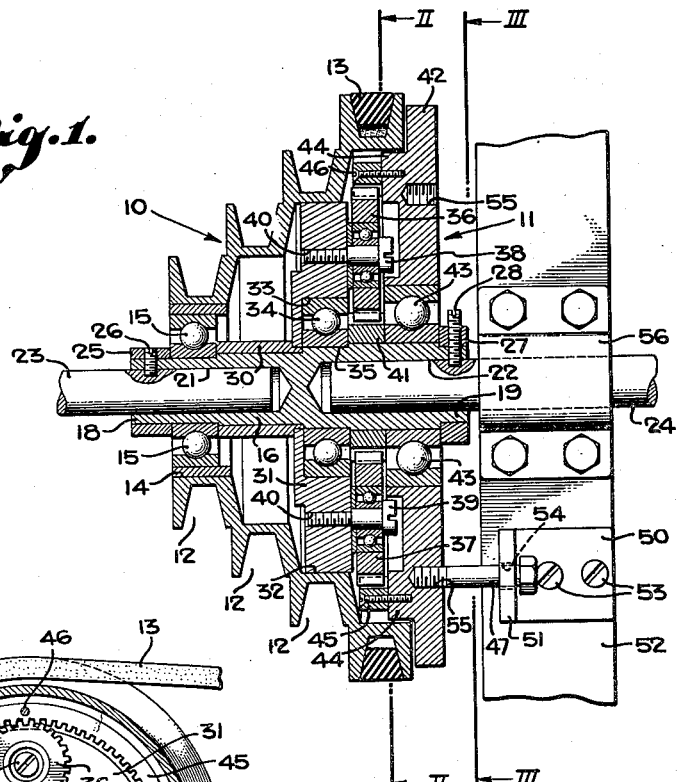
Fig. 1 is a vertical, sectional view illustrating one form of a device embodying the invention.
Figure 2:
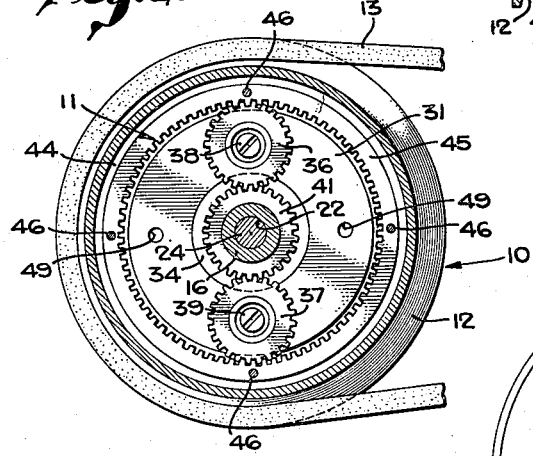
Fig. 2 is a reduced sectional view taken along the line II—II of Fig. 1.
Figure 3:
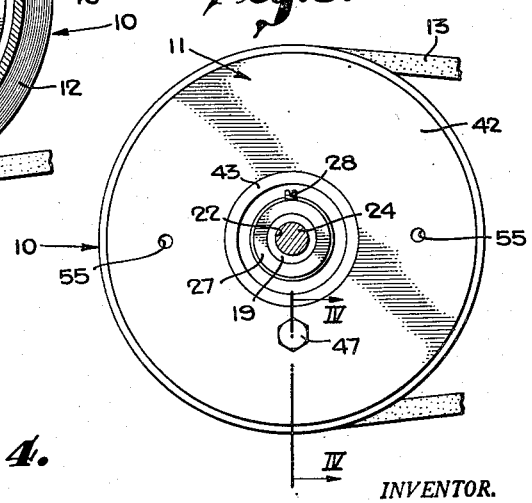
Fig. 3 is a sectional view taken along the line III—III of Fig. 1.

Referring to the drawings, Figs. 1 to 4, inclusive, illustrate a preferred form of the invention, wherein there is illustrated a stepped, hollow pulley, indicated in its entirety by 10, having a transmission indicated in its entirety by 11. In the form shown, the pulley 10 consists of a hollow housing formed to provide a series of grooves 12, the diameters of which vary in stepped relation, each adapted to receive a belt 13 which connects the pulley with another pulley driven by a suitable motor. Belt 13 may be of substantially V-shape to correspond with the contour of the grooves 12 and employed for the usual purpose for drivably connecting one pulley with another.

The small end of the pulley casting is provided with a horizontal bore 14 for receiving and accommodating a ball bearing 15, in which one end of a hub 16 is journalled. The hub 16 extends centrally through the pulley casting and projects outwardly from each end of the casting as shown at 18 and 19. Hub 16 may be hollow, to receive a spindle or shaft, but in the example each of its ends is provided with an axial bore, 21 and 22. These bores 21 and 22 may be of different diameters for accommodating different size shafts 23 and 24, respectively. Suitable means is provided for rigidly fixing the shafts within their respective bores and, as illustrated, a sleeve 25 may be disposed about the end portion 18 of the hub 16 and provided with a key such as set screw 26, for connecting the ring to the hub and to the shaft 23. At the other end of the hub 16 there is provided a ring 27 disposed about a reduced portion in the end 19 of the hub 16 and having a threaded means 28 extending through the ring 27, hub portion 19 and into the shaft 24. These ring members 25 and 27 also operate to maintain the pulley in proper position on the hub 16.

The transmission, represented in its entirety by 11, includes a partition or spider 31, the latter being annular in shape and arranged to form a press fit with the shoulder 32 provided in the pulley casting, or the partition 31 may be welded to the shoulder 32 of the pulley casting, whereby the partition 31 is rigidly fixed to and rotatable with the pulley casting. The annular partition 31 is provided with an inner central recess 33 for receiving a ball bearing 34, the inner surface of the latter being fitted into the hub 16, as shown at 35. A spacer ring 30 may be provided for cooperating with sleeve 25 for properly locating bearing 15. It can now be seen that the pulley casting and partition 31 is supported on and rotatable relative to the hub 16 by the ball bearings 15 and 34.

On the outer face of the spider or partition 31 there are provided oppositely disposed gears 36 and 37. The gears 36 and 37 are rotatably mounted on studs 38 and 39, the latter being threaded into spider 31 as shown at 40. Rigidly mounted on the hub 16 and turnable therewith is a gear 41, the latter adapted to mesh with the gears 36 and 37. The gear 41 may be termed a sun gear, while the gears 36 and 37 may be termed planetary gears.

Mounted at the large end of the pulley casting is an annular member 42 rotatably supported upon the hub 16 by means of a ball bearing 43. The inner surface of the annular member 42 carries an annular projection 44, the inner face thereof being provided with an internal ring gear 45. The latter may be fixed to the annular projection 44 by means of screws 46. The ring gear 45 is arranged to mesh with the gears 36 and 37.

Figure 4:
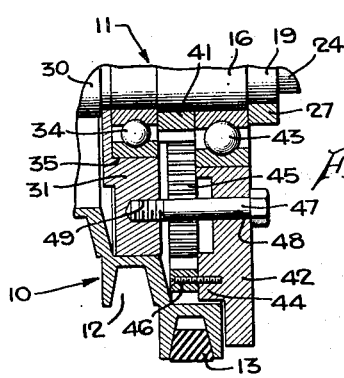
Fig. 4 is a detailed sectional view taken along the line IV—IV of Fig. 3.

Means is provided for locking the annular member 42 carrying the internal gear 45 with the spider 31, which means may consist of an anchor bolt 47, best shown in Fig. 4. This anchor bolt extends through an opening 48 provided in the annular end member 42 and into a corresponding threaded opening 49 in the spider 31.

It can now be understood that when the end member 42 carrying the ring gear 45 is in fixed locked relation with the spider 31 (by means of the anchor bolt 47) the pulley will be locked to the shaft or shafts and hub through engagement of 45, 36 and 41, so that rotational speed of pulley and shafts 23 and 24 will be the same. For the purpose of providing an increased speed of the shafts relative to the speed of the pulley, the anchor bolt 47 is removed from the opening 48, releasing the ring gear 45 for relative movement with the spider 31. In order to effect this relative movement, it is necessary that the ring gear 45 be held stationary. Any suitable means may be provided for maintaining the ring gear 45 stationary while the pulley is rotated relative thereto. In the form shown, a bracket 50 having a flange 51 is rigidly secured to a supporting structure 52 by any suitable means, such as screws 53. The flange 51 of the bracket 50 is provided with an opening 54, and the outer face of the end member 42 is provided with oppositely disposed threaded openings 55, either of which may be brought into alignment with the opening 54 in the flange 51, whereby the anchor bolt 47 may be positioned through the opening 54 in the flange 51 and threaded into opening 55 in the end member 42. Since the flange 51 is rigidly mounted on the stationary support 50, the anchor bolt 47 will operate to maintain the end member 42 carrying the ring gear 45 stationary. The shaft 24 may be journalled onto the support 50, as shown at 56. It can now be understood that upon rotating the pulley by the belt 13, the spider 31 carrying the gears 36 and 37 will rotate the sun gear 41 in accordance with the differential between the number of teeth on the stationary gear 45 and the number of teeth on the sun gear 41, and since there are a greater number of teeth on the internal gear 45 than the sun gear 41, the planetary gears meshing with and drivably connecting the internal gear 45 and the sun gear 41, will increase the speed of rotation of the sun gear 41 relative to the rotation of the spider 31 carrying the inter-meshing gears 36 and 37. Since the spider 31 is rigidly fixed to the pulley casting the pulley will rotate accordingly.

Conversely, if either of the shafts 23 or 24 were employed as a driving shaft for the pulley 10, then the speed of the pulley would be reduced relative to the shaft in accordance with the ratio of the number of the teeth on the pulley to the number of teeth on the inernal gear. Accordingly, the pulley illustrated in Figs. 1 to 4, inclusive, may be selectively employed to drive a shaft at the same speed or at a greater speed relative to the speed of the pulley. It will be noted that when the pulley is locked for direct drive (Fig. 4) and also when the differential drive is used (Fig. 1) the shaft or hub and pulley revolve in the same direction.

It is often desirable that the pulley rotate in a direction opposed to the direction of rotation of the shaft on which it is arranged. The present invention includes an embodiment illustrated in Figs. 5 to 8, inclusive, wherein differential means is provided for mounting the pulley on the shaft for opposite rotation relative to the shaft. In this embodiment, shaft 61 is journalled for rotation in a suitable means 62, carried by any stationary supporting structure 63. On the end of the shaft 61 is mounted a pulley consisting of a hub 64 detachably fixed to the shaft 61 by means of a ring 65 having a threaded means 66 for anchoring the ring 65, and hub 64, to the shaft 61. The hub 64 is journalled within a stationary tubular member 67. The tubular member 67 is held stationary relative to the supporting structure 63 by means of a bracket 68. The lower end of the bracket is fixed to the supporting structure 63 by means of a flanged member 69, the latter being adjustably fixed to the lower end of the bracket 66 by means of an elongated slot 71 in the lower end of the bracket 68 arranged to cooperate with an opening 72 provided in the flange of the member 69. Threaded means 73 disposed through the cooperating opening 72 and elongated slot 71 is provided for detachably connecting the bracket 68 in rigid, fixed relation with the supporting structure 63. The end of the stationary tubular member 67 may be serrated or provided with splines for engagement with serrated opening in the upper end of the bracket 68 for preventing relative movement between the member 67 and bracket 68. Other means, such as welding, may be provided for connecting the stationary member 67 with the bracket 68.

The stationary member 67 is enlarged at its outer end as shown at 74. The enlarged portion 74 of the stationary member 67 is recessed at 75 and provides an annular space between the hub 64 and the enlarged portion 74 for receiving a sleeve bearing 76. The pulley casting, represented in its entirety by 77, presents an inner annular surface 78 opposed to the outer surface 79 of the enlarged portion 74 of the stationary member 67, these surfaces 78 and 79 being spaced apart and arranged to receive a sleeve bearing 81.

The outer end of the stationary member 67 is provided with a spider 82 rigidly fixed thereto and held stationary therewith. The spider 82 extends equidistant on the opposite sides of the stationary member 67 and on its outer face is provided oppositely disposed gears 83 and 84. These gears are rotatably supported on the spider by any suitable means, such as shown at 85. The spider 82 is provided with a central opening 86 arranged to turnably receive a reduced portion 87 provided at the outer end of the hub 64. A sun gear or idle gear 88 is positioned on and rigidly fixed to the reduced portion 87 of the hub 64 and arranged to mesh with the gears 83 and 84. A suitable washer or retaining plate 80 is provided on the outer end of the hub 64 and retained thereon by suitable means, such as the nut 89 threaded onto the outer end of the hub 64. The casting further presents an inner, annular shoulder 91 adjacent the outer end of the device for receiving an internal ring gear 92, the latter being held in fixed relation with the pulley casting by a threaded means 93.

It can now be understood that the gears 83 and 84 will be held stationary by means of the spider 82 carried by the stationary member 67, and since the gears 83 and 84 mesh with the internal gear 92 and sun gear 88 that as the pulley is rotated by the belt 13, the hub 64 will be rotated by way of the sun gear 88 at a greater rate of speed than the speed of the pulley. This is, of course, effected by the ratio of the number of teeth of the driving gear 92 and driven gear 88.

A suitable cover 94 may be arranged to enclose the outer end of the pinion and provide an oil well for lubricating the movable parts of the device. Oil may be supplied by way of the oil connection 95 and the cover 94 may be attached to the device by the threaded means 93 connecting the ring gear 92 with the pulley casting.

In the second embodiment illustrated by Figs. 5 to 8, inclusive, the differential only provides a single speed, wherein the direction of rotation of the pulley is opposite to that of the shaft on which it is mounted. In this embodiment, the pulley imparts to the shaft a greater rate of speed than itself when the pulley is arranged to drive the shaft and, conversely, when the shaft is arranged to drive the pulley, the speed imparted to the pulley is less than the driving shaft.

Accordingly, there is provided a pulley equipped with transmission for selectively varying the speed of the pulley relative to the shaft on which it is mounted. The present device may be employed either as a driving or driven element. The pulley, together with the transmission, is a homogeneous, compact structure and may be moved from shaft to shaft as desired. The present pulley, when utilized in connection with a stepped pulley, greatly increases the variations of the relative speeds between a driving unit and a driven unit and vice versa. The present device augments the art of machining and greatly increases the precision of the tolerance of the work produced by machine tools used in machining materials of different characteristics. Furthermore, the device is simple and durable in structure, easy to assemble and disassemble for inspection, repair or replacements and may be manufactured at a relatively small cost.

While I have illustrated and described only two embodiments of the invention, it will now be apparent to those skilled in the art that certain changes, modifications, substitutions, additions and omissions may be made in the exemplary forms here illustrated and described without departing from the spirit and scope of the invention.

I claim:

1. A variable speed transmission pulley comprising: a substantially hollow stepped pulley including a transverse partition intermediate its ends; a hub journalled at spaced points in said pulley, said partition being one of the journal points; means for connecting the hub to a shaft; a sun gear carried by the hub adjacent said partition; planetary gears rotatably carried by the partition and in engagement with the sun gear; a cover plate journalled on the hub, said plate being provided with an internal ring gear in engagement with the planetary gears; selectively operable means for connecting the cover plate and partition for joint movement and selectively operable means for immobilizing the cover plate and ring gear as a separate unit.

2. In a variable speed transmission pulley, the combination of: an elongated hub adapted to be fixed to a shaft to be rotated; a cone-shaped, stepped, virtually hollow pulley concentric with said hub; means rotatably supporting said pulley at spaced points along said hub, said means including a transverse partition positioned between ends of the pulley and journalled on said hub; a plurality of planetary gears rotatably mounted on said partition; a sun gear carried on said hub in engagement with said planetary gears; an internal ring gear journalled on said hub and in engagement with said planetary gears; and selectively operable means for securing said ring gear and said pulley against relative movement and for independently immobilizing said ring gear.

3. In a variable speed transmission pulley, the combination of: an elongated hub adapted to be fixed to a shaft to be rotated; a cone-shaped, stepped, virtually hollow pulley concentric with said hub; means rotatably supporting said pulley at spaced points along said hub, said means including a transverse partition positioned between ends of the pulley and journalled on said hub; a plurality of planetary gears rotatably mounted on said partition; a sun gear carried on said hub in engagement with said planetary gears; a cover plate journalled on said hub and provided with an internal ring gear in engagement with the planetary gears; selectively operable means for connecting the cover plate and partition for joint movement; and selectively operable means for immobilizing the cover plate and ring gear as a separate unit.

4. In a variable speed transmission pulley, the combination of: an elongated hub adapted to be fixed to a shaft to be rotated; a cone-shaped, stepped, virtually hollow pulley concentric with said hub; spaced means rotatably supporting said pulley on said hub and including an internal transverse partition intermediate ends of the pulley and fixed thereto; a plurality of planetary gears rotatably mounted on said partition; a sun gear carried on said hub in engagement with said planetary gears; a cover plate journalled on said hub and provided with an internal ring gear in engagement with the planetary gears; selectively operable means for securing said cover plate and said pulley against relative movement; and selectively operable means for independently immobilizing said cover plate including said ring gear as a separate unit.

PHILLIPS F. HENRY.

REFERENCES CITED

The following references are of record in the file of this patent:

UNITED STATES PATENTS

| Number | Name | Date |
|---|---|---|
| 252,537 | Stewart | Jan. 17, 1882 |
| 1,169,852 | Megow | Feb. 1, 1916 |
| 2,208,041 | Norin | July 16, 1940 |
| 2,252,967 | Forton | Aug. 19, 1941 |
| 2,321,960 | Wearn | June 15, 1943 |